(12) United States Patent
Rardin

(10) Patent No.: US 6,953,329 B2
(45) Date of Patent: Oct. 11, 2005

(54) HURRICANE AND POWER OUTAGE FAN

(76) Inventor: Gerald L. Rardin, 3664 NW. 32nd Ave., Ft. Lauderdale, FL (US) 33309

( * ) Notice: Subject to any disclaimer, the term of this patent is extended or adjusted under 35 U.S.C. 154(b) by 240 days.

(21) Appl. No.: 10/442,686

(22) Filed: May 21, 2003

(65) Prior Publication Data
US 2004/0234384 A1 Nov. 25, 2004

(51) Int. Cl.[7] ............................. F04B 17/03
(52) U.S. Cl. ....................................... 417/411
(58) Field of Search ......................... 417/234, 411

(56) References Cited

U.S. PATENT DOCUMENTS

| | | | | |
|---|---|---|---|---|
| 2,972,057 A | * | 2/1961 | Boehmer et al. | 307/10.1 |
| 3,323,249 A | * | 6/1967 | Randall | 43/57 |
| 3,842,288 A | * | 10/1974 | Bradshaw | 307/10.1 |
| 4,627,797 A | * | 12/1986 | Rill, Jr. | 417/411 |
| 4,665,862 A | * | 5/1987 | Pitchford, Jr. | 119/51.11 |

\* cited by examiner

Primary Examiner—Charles G. Freay
(74) Attorney, Agent, or Firm—David P. Lhota; Stearns, Weaver, Miller, Weissler, Alhadeff & Sitterson, P.A.

(57) ABSTRACT

A hurricane and power outage fan that includes a battery powered fan that is operable for a period of time on the power stored in a number of batteries provided with the fan. The battery-powered fan includes an AC to DC converter that supplies power to a trickle charge circuit for keeping the batters fully charged as long as the AC plug is plugged into a power outlet. When the power goes out, the fan runs on the batteries for a predetermined period of time.

6 Claims, 3 Drawing Sheets

HURRICANE AND POWER OUTAGE FAN

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates generally to a fan having a back-up power charging system, and more particularly to a self-powered hurricane and power outage fan including a DC motor, fan blade assembly mounted to the motor output shaft, plurality of batteries, AC to DC power converter, trickle charging circuit for maintaining or providing the charge on the batteries, switch for switching to DC power and low power back-up battery charge indicator.

2. Description of Related Art

Power is typically lost during and after a hurricane or powerful storm. As hurricanes and severe storms normally occur during the summer in sub-tropical regions, it becomes very hot after a hurricane without available power to run a fan or air conditioner. Fans known in the prior art do not include an auxiliary source of power or a reliable alternative source of power as contemplated by the instant invention. This is in part due to the fact that batteries lose power over long periods of use or no use. Accordingly, it would be desirable during such periods to have a fan with back-up battery power and the means to maintain its charge. Because having a full charge on the batteries when the power goes out would be desirable, it would be beneficial to have a battery powered fan that included an AC to DC converter that would supply power to a trickle charge circuit during use for keeping the batteries charged. As the background art fails to disclose a self-charging fan as contemplated by the instant invention, the need for such a device is readily apparent. The instant invention addresses this unfulfilled need in the prior art.

BRIEF SUMMARY OF THE INVENTION

In light of the foregoing, it is a primary object of the present invention to provide a self-charging fan that charges a back-up power supply.

It is another object of the instant invention to provide fan that is operable during power outages.

It is a further object of the instant invention to provide a fan that maintains a battery charge during power outages.

It is an additional object of the instant invention to provide a fan having a self-charging backup power supply comprising a self-charging DC fan assembly.

It is also an object of the instant invention to provide a self-charging DC fan assembly including a DC motor having a fan blade assembly mounted to the motor output shaft, a fan housing supporting the DC fan assembly having a slide out tray having six, six-Volt batteries carried therein; an AC to DC power converter for supplying DC power to the fan motor when AC power is available and a trickle charging circuit for maintaining the charge on the six, six-Volt batteries; a switch over switching network for switching the DC motor power supply from AC to DC converter to the six, six-Volt batteries; the trickle charging circuit including a low battery charge indicator light.

In light of these and other objects, a hurricane and power outage fan is provided. The hurricane and power outage fan includes a DC fan assembly including a DC motor having a fan blade assembly mounted to the motor output shaft, a fan housing supporting the DC fan assembly having a slide out tray having a plurality of batteries, preferably six, six-Volt batteries carried therein, an AC to DC power converter for supplying DC power to the fan motor when AC power is available and a trickle charging circuit for maintaining the charge on the batteries. The fan also includes a switching network for switching from AC power to the DC motor power supply. The switching network switches the DC power supply from the AC-DC converter to the backup batteries. The trickle charging circuit may also include a battery charge indicator light for indicating the low charge or the remaining charge.

In accordance with the foregoing invention and other objects, which will become apparent hereinafter, the instant invention will now be described with particular reference to the accompanying drawings.

BRIEF DESCRIPTION OF THE SEVERAL VIEWS OF THE DRAWINGS

For a further understanding of the nature and objects of the present invention, reference should be made the following detailed description, taken in conjunction with the accompanying drawings, in which like elements are given the same or analogous reference numbers and wherein.

DETAILED DESCRIPTION OF THE INVENTION

Figure 1:
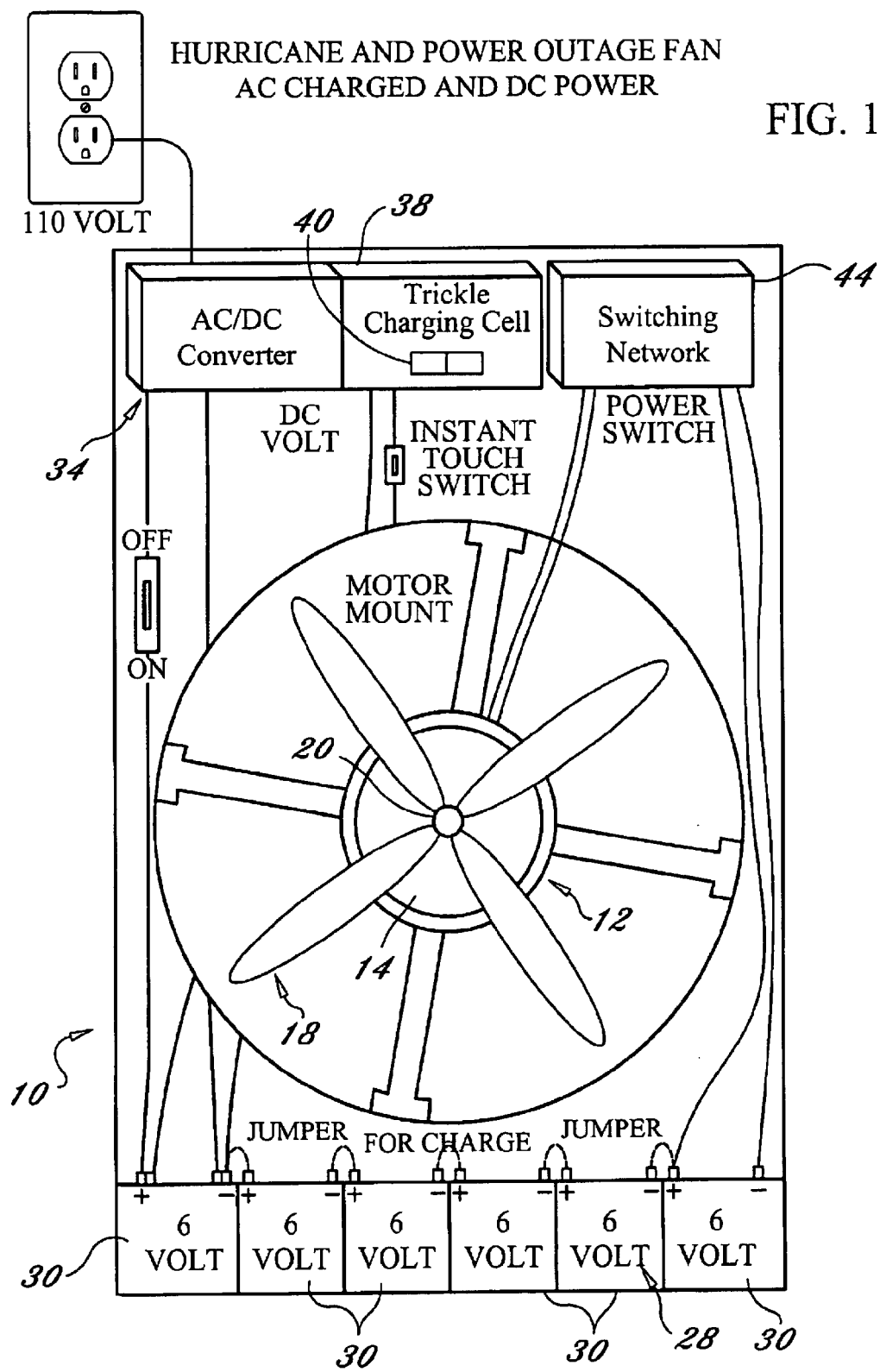
FIG. 1 is a front plan view of an exemplary embodiment of the hurricane and power outage fan of the present invention.
Figure 2:
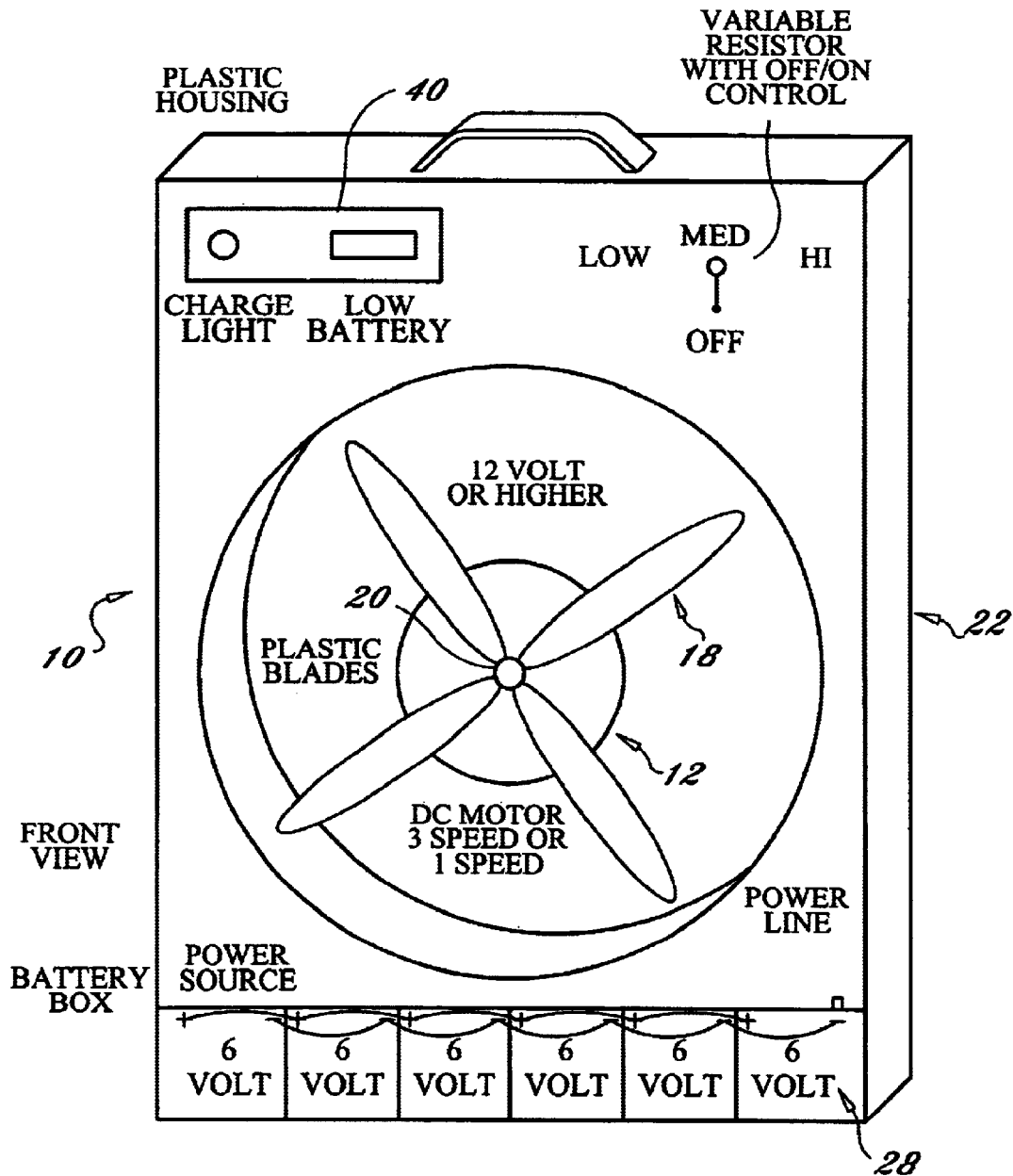
FIG. 2 is a perspective view of the hurricane and power outage fan of FIG. 1.
Figure 3:
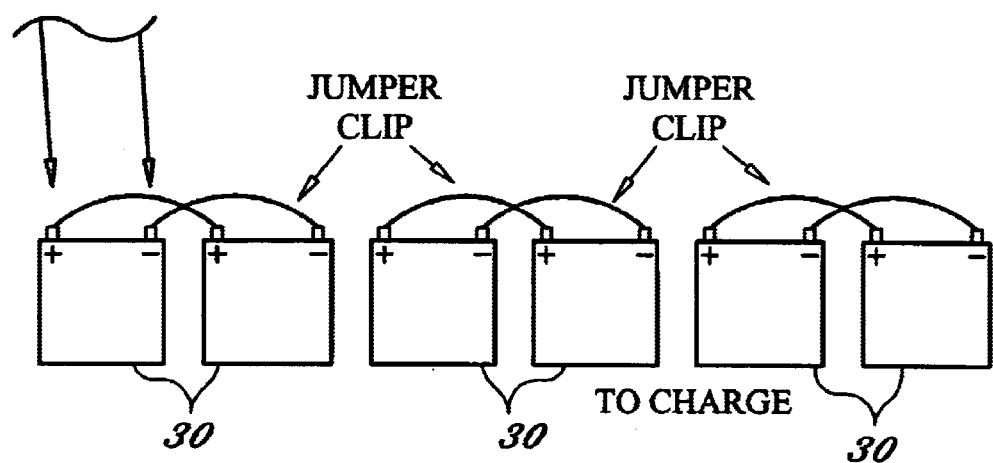
FIG. 3 is a site plan view showing the six batteries linked by cables.

With reference to the drawings, FIGS. 1–3 depict the preferred embodiment of the instant invention which is generally referenced as fan and, or by the numeric character 10. FIGS. 1–3 show various aspects of an exemplary embodiment of the hurricane and power outage fan 10 of the present invention. The fan 10 comprises a DC fan assembly 12, a fan housing 22 for supporting the DC fan assembly 12, a slide out tray 28, a battery supply comprising at least one battery and preferably a plurality of batteries 30 (preferably six, six-Volt batteries) which are stored and supported in the tray 28, an AC to DC Power converter 34 for converting AC power to DC power, a trickle charging circuit 38 for charging and maintaining the charge on the battery supply 30 when AC power is available, and a switch over or switching network 44 for switching the power source to the DC motor 14 from AC power to DC power such that DC power is supplied to the DC motor when AC power is not available.

The switching network 44 switches the connection to the DC motor 14 from the AC to DC power converter 34 to the batteries 30. The DC fan assembly 12 comprises a DC motor 14, fan blade assembly 18 and motor output shaft 20 connected to the fan blade assembly 18. The trickle charging circuit 38 includes a low battery charge and, or charge indicator light 40. The battery supply 30 preferably provides approximately thirty-six volts of DC power. The trickle charging circuit 38 is electrically connected to the battery source 30 to provide a charging current to the battery supply 30.

It can be seen from the preceding description that a hurricane and power outage fan has been provided. When the fan 10 is running, AC power is directed to the battery supply 30 to charge and, or maintain a charge in the batteries 30. The rotation of the fan blade assembly 18 may also provide a charging source wherein rotation energy is converted to electrical energy.

It is noted that the embodiment of the hurricane and power outage fan described herein in detail for exemplary purposes is of courses subject to many different variations in structure, design, application, and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fan comprising:

a DC fan assembly;

a DC battery supply;

a power supply including a means for receiving and providing AC power, an AC-DC converter, a charging circuit and a means for supplying said DC power to said DC fan assembly when AC power is not received;

said AC-DC power converter in electrical communication with said AC power means and said DC fan assembly for converting AC power to DC power for providing said DC power to said DC fan assembly;

said charging circuit in electrical communication with said AC power means and said DC battery supply for charging said DC battery supply with said AC power when AC power is available;

a housing for supporting and enclosing said DC fan assembly and said power supply; and said housing further comprising a tray for storing said DC battery supply.

2. A fan as recited in claim 1, wherein said DC fan assembly comprises:

a DC motor having an output shaft; and a fan assembly having a plurality of fan blades, said fan assembly being in mechanical communication with said output shaft.

3. A fan as recited in claim 1, wherein said DC battery supply provides approximately 36 volts.

4. A fan as recited in claim 1, wherein said DC battery supply comprises six, six-volt batteries.

5. A fan as recited in claim 1, wherein said means for supplying said DC power to said DC fan assembly comprises a switching circuit that removes AC power from the DC fan assembly and provides said DC power to said DC fan assembly.

6. A fan as recited in claim 1, further comprising means for indicating the charge level in said DC battery supply.

* * * * *